INVENTORS.
ARISTID V. GROSSE
EDWARD A. NODIFF

2,863,824

HYDROCARBON CONVERSION PROCESSES WITH RECOVERY OF FLUORINE CONTAINING GASES

Aristid V. Grosse, Haverford, and Edward A. Nodiff, Philadelphia, Pa.

Application December 14, 1953, Serial No. 398,052

4 Claims. (Cl. 208—115)

This invention relates to the catalytic conversion of hydrocarbons and more particularly to catalytic conversion processes involving the use of particle-form catalysts whose efficacy has been enhanced by means of a fluorine compound.

In conventional hydrocarbon conversion processes such as catalytic cracking or reforming, materials containing silica and/or alumina are customarily employed as catalysts for promoting the desired reactions. Acid treated clays and synthetically prepared materials such as silica-alumina, silica-magnesia, silica-zirconia and the like are well known as cracking catalysts. During the course of the cracking reaction, carbonaceous matter is formed and deposits on the catalyst thus reducing its activity. It is customary to regenerate the catalyst by burning off the carbonaceous deposit, following which the catalyst is re-used for conversion of further amounts of hydrocarbon charge. During prolonged use in this manner the inherent activity of the catalyst gradually drops, so that eventually it has to be discarded from the system and replaced by fresh catalyst.

It has been proposed heretofore to improve the activity of hydrocarbon conversion catalysts containing silica and/or alumina by treatment with various fluorine compounds, for example, by treating the catalyst with HF or $SiF_4$. The fluorine apparently enters into chemical combination with the catalyst in some manner, thereby improving its activity for promoting cracking reactions. In place of HF or $SiF_4$, organic fluorine compounds can be used to supply fluorine to the catalyst; such compounds apparently are converted, under the conditions prevalent in hydrocarbon conversion systems, to HF which reacts with the silica or alumina components of the catalyst to increase its activity. It has been proposed to treat the catalyst continuously with the fluorine-containing compound, the treatment being either before, during or after the regeneration, so as to maintain the catalyst activity continuously at a high level. However, in spite of the distinct improvement in activity resulting from the presence of fluorine, this procedure has not proved to be economically feasible heretofore. This has been due, at least in part, to the large cost involved in continuously adding an expensive fluorine-containing compound, such as HF or $SiF_4$, to the system.

We have now found that fluorine which has been added to a cracking catalyst to improve its effectiveness tends to migrate through the catalyst rather rapidly in the form of HF and/or $SiF_4$. These compounds are present in certain effluent streams leaving the catalyst and hence become lost from the cracking system. We have further found that the fluorine can be recovered from such effluent streams for re-use in the cracking system. Recovery of the fluorine is achieved by contacting the effluent stream containing HF and/or $SiF_4$ with a solid contact material adapted to retain fluorine by reaction with the fluorine compounds present in the effluent stream. Suitable contact agents for this purpose include alumina-containing materials such as bauxite or activated alumina, NaF-containing materials such as NaF alone or NaF deposited on suitable supports, similar KF-containing materials, and siliceous materials such as cracking catalysts having a low or no fluorine content. In one embodiment of the invention, the fluorine can be allowed to build up for a time in the contact material and periodically can be displaced therefrom for use in treating fresh catalyst or used catalyst which has become depleted in fluorine content. In another embodiment, the effluent stream containing the fluorine compounds can be contacted directly with fresh or used catalyst under conditions conducive to retention of the fluorine by the catalyst.

It will be understood that while the present description may refer to the addition of fluorine and its migration or transfer through the system, it is not meant to imply that the fluorine is present in elemental form but rather in the form of one or more appropriate fluorine compounds. If desired, fluorine could be introduced to the catalyst initially in elemental form, but it would readily be converted by reaction to a fluorine compound and hence would not remain as elemental fluorine.

The invention is more fully described in conjunction with the accompanying drawings in which.

Figure 1:
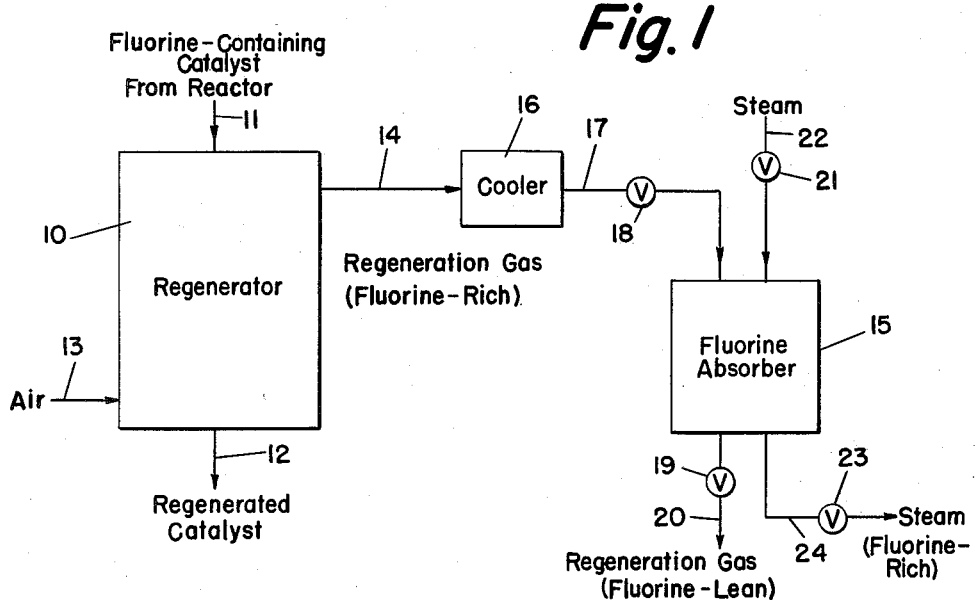
Fig. 1 is a simple diagrammatic illustration of a manner of practicing the invention.

Referring to Fig. 1, 10 illustrates a regenerator into which a cracking catalyst from a reactor is fed for purpose of regenerating it by burning off carbonaceous deposits. The used catalyst is fed into regenerator 10 by means of line 11 and regenerated catalyst is withdrawn from the bottom through line 12. Air is introduced through line 13 and flows upwardly countercurrent to the catalyst. Temperatures within the regenerator generally are within the range of 800–1100° F.

The catalyst entering regenerator 10 has previously been treated with a fluorine compound such as HF, $SiF_4$ or an organic fluoride and therefore contains fluorine in chemically combined form. Generally the amount of fluorine in the catalyst on a carbon-free basis is within the range of 0.005–15% by weight and preferably lies within the range of 0.1–5% by weight. Under the high temperature conditions prevailing in regenerator 10 the fluorine tends to be released from the catalyst in the form of HF and $SiF_4$, which compounds leave the regenerator through line 14 along with the effluent stream of regeneration gas. Moisture formed as a result of the combustion of the carbonaceous deposits effects hydrolysis of fluorine in the catalyst and promotes its loss to the effluent gas stream. The high temperature in the regeneration zone is another factor which aids in this release of fluorine from the catalyst in the form of HF and $SiF_4$.

The fluorine in the regeneration gas is recovered by contacting the gas in an absorber 15 with a solid contact agent adapted to react with the fluorine compounds and so retain the fluorine. An alumina gel or silica-containing material such as discarded cracking catalyst may be used for this purpose. By way of example, the contact agent may be considered to be an alumina-containing material such as bauxite. A material of this type will store up the fluorine by reacting with HF in the regeneration gas to form aluminum fluoride, and with $SiF_4$ to form aluminum silicofluoride. The latter compound may undergo hydrolysis in the presence of moisture to form silica and HF, the HF then reacting to form aluminum fluoride.

The retention of fluorine by the bauxite is aided by reduction in temperature; hence it is preferred to pass the regeneration gas from line 14 through a cooler 16 and then through line 17 and valve 18 to absorber 15. For example, the regeneration gas issuing from regenerator 10 may have a temperature of 800–1100° F. while the gas, after passing through cooler 16, may have its temperature reduced to below 600° F. and more preferably below 400° F. but not below its dewpoint to improve the effectiveness of the bauxite for retaining the fluorine. Cooler 16 may constitute any conventional or suitable means for recovering and utilizing heat from the regeneration gas, such as a heat exchanger, turbo-compressor or the like. The treated regeneration gas, lean in fluorine content, is removed from absorber 15 through valve 19 and line 20.

It will be understood that fluorine absorber 15 may actually constitute a plurality of separate zones which are used alternately. While one absorber is being utilized to treat the regeneration gas, another absorber may be undergoing treatment to remove fluorine previously retained therein. Such removal of fluorine can be effected by steaming the contact material at high temperature. This operation may be illustrated in Fig. 1 by considering that valves 18 and 19 are closed while valve 21 in steam inlet line 22 and valve 23 in steam exit line 24 are opened. Steaming should be done at sufficiently high temperature, preferably above 400° F., to hydrolyze the fluorine compounds formed in the contact material and thus drive out the fluorine, mainly in the form of HF, in admixture with the steam. The exit steam, rich in fluorine, may then be contacted either with fresh catalyst or with catalyst which has become depleted in fluorine content during previous use. This procedure minimizes loss of fluorine from the system and accordingly reduces the cost of activating the catalyst by means of fluorine.

According to the present invention, in place of an alumina-containing material such as bauxite, NaF or KF is used as the contact material for retaining and storing fluorine in absorber 15. These materials may, if desired, be deposited on a suitable granular support to increase the surface area available for contact with the regeneration gas. They have the advantage over bauxite or other alumina-containing materials in that neither NaF nor KF has the tendency to absorb moisture as alumina has. The type of reactions which these materials undergo with the fluorine compounds in the effluent gas can be illustrated typically for NaF, which will react with HF from NaF·HF and with $SiF_4$ to form $Na_2SiF_6$. Again as when bauxite is employed, a temperature in absorber 15 which is below 600° F. and more preferably below 400° F. is desirable to favor the formation of these compounds and effectively remove fluorine from the regeneration gas. It is to be noted that $CaF_2$ is not suitable for use as the contact agent, since it does not form an addition compound with HF as does NaF and KF.

In utilizing either NaF or KF as the fluorine absorbing agent in absorber 15, recovery of the fluorine therefrom likewise may be effected by steaming at high temperature as previously described. Preferably a temperature of at least 400° F. is desirable when either of these contact agents is used, although lower temperatures can be employed.

Figure 2:
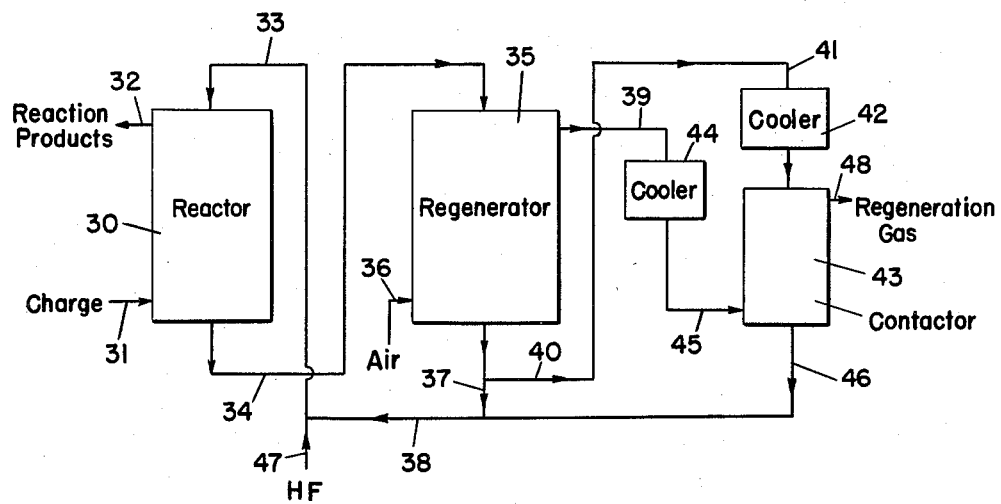
Fig. 2 is another diagrammatic illustration of a simplified hydrocarbon conversion process incorporating an embodiment of the invention.

Fig. 2 illustrates an embodiment of the invention which involves the use of a portion of the cracking catalyst itself for removing fluorine from the regeneration gases. In the process of Fig. 2, charge hydrocarbons are introduced to reactor 30 through line 31 and the reaction products are withdrawn through line 32. Catalyst containing combined fluorine is fed into the top of the reactor through line 33 and passes downwardly therein in the form, for example, of a moving bed. A cracking temperature of, for example, 800° F.–1100° F. is maintained within the reactor. Deactivated catalyst containing carbonaceous matter resulting from the cracking reaction is withdrawn from the bottom of the reactor via line 34.

The deactivated catalyst passes to the top of regenerator 35 wherein it may likewise be maintained in the form of a downwardly moving bed. Air is introduced adjacent the bottom of regenerator 35 through line 36 for countercurrent flow upwardly to burn carbonaceous matter from the catalyst. The flowing gas phase aided by the high temperature and the presence of moisture resulting from the combustion, tends to strip fluorine in the form of HF and $SiF_4$ from the catalyst and carry it out of the regenerator with the effluent gas in line 39. Regenerated catalyst is withdrawn from the bottom of regenerator 35 and a portion, usually a major portion, of it is passed through lines 37, 38, and 33 directly back to reactor 30 for re-use.

The remainder of the catalyst which is not returned directly to the reactor is utilized for countercurrently contacting the regeneration gas which issues from regenerator 35 with a relatively high fluorine content. This portion of catalyst is sent through lines 40 and 41 and preferably then through a cooler 42. Reduction of the catalyst temperature in cooler 42 is desirable to improve its effectiveness for retaining fluorine in the subsequent step of contacting the regeneration gas, and the temperature of the catalyst preferably is reduced to below 600° F. The regeneration gas from line 39 likewise is sent through a cooler 44 to reduce its temperature preferably to below 600° F. before contacting it with the catalyst. The contacting step is carried out in a countercurrent contactor 43 into which the cooled catalyst is fed at the top while the cooled regeneration gas is introduced adjacent the bottom by means of line 45. Contacting of the catalyst and regeneration gas in this manner effectively removes fluorine from the gas phase and stores it in the catalyst, in spite of the fact that the same gas while in the regenerator had displaced fluorine from the catalyst. One reason for retention of fluorine by the catalyst in contactor 43 is the relatively low temperature therein as compared to the temperature in regenerator 35. Another factor favoring a higher fluorine content in catalyst leaving the contactor as compared to catalyst leaving regenerator 35 results from the difference in fluorine contents in the respective gas phases. While the catalyst which leaves the bottom of contactor 43 through line 46 is in contact with a gas phase (regeneration gas) having a substantial fluorine content, that which leaves the bottom of regenerator 35 is in contact with a gas phase (air) having no fluorine content.

The fluorine-rich catalyst from contactor 43 is passed through line 46 to line 38 for admixture with the other portion of catalyst coming directly from the regenerator. HF or other fluorine-containing compound may be added through line 47 to maintain the level of activity required for the circulating catalyst. Regeneration gas which has been depleted of fluorine in contactor 43 is removed from the system through line 48.

Figure 3:
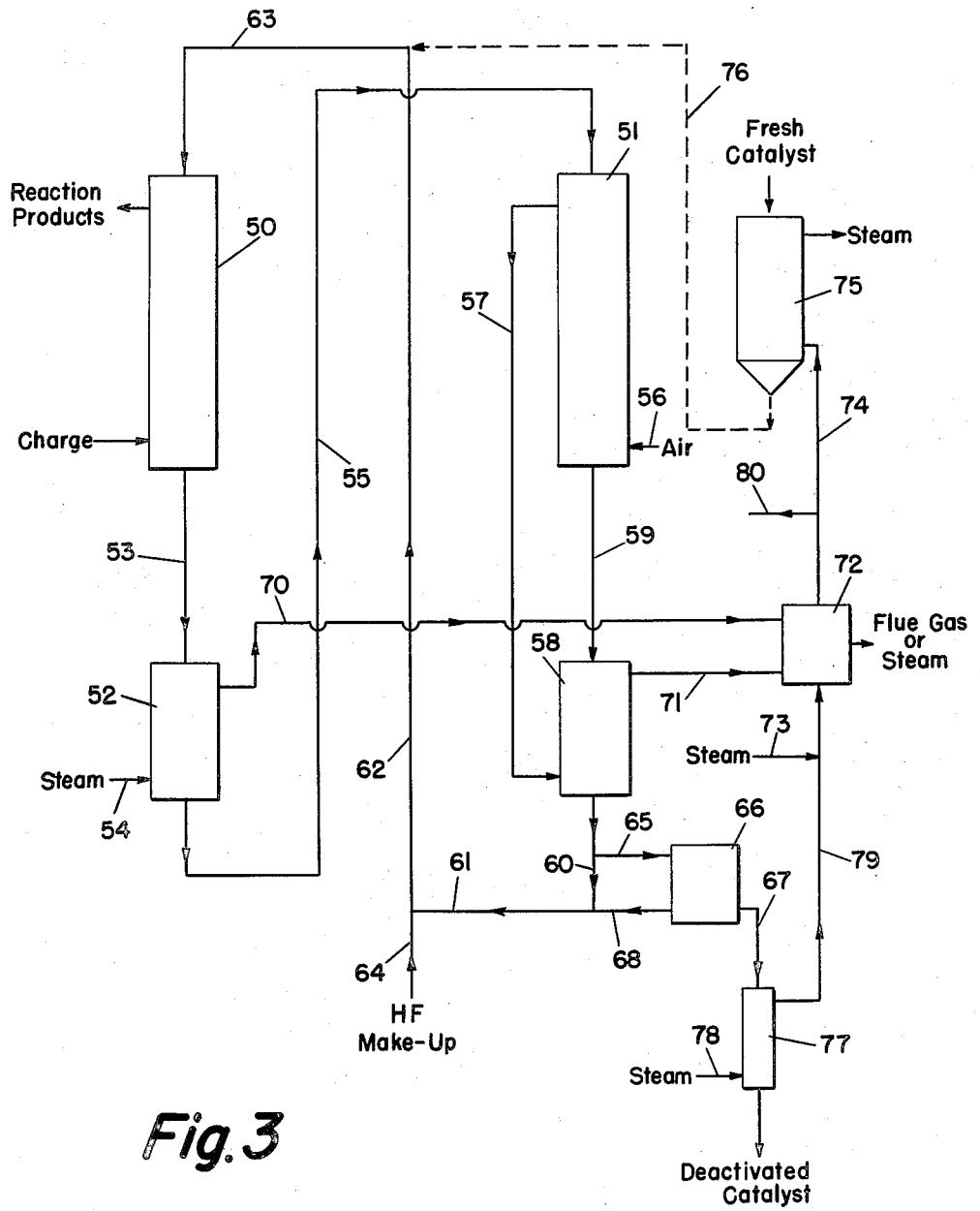
Fig. 3 is a diagrammatic illustration of a more detailed hydrocarbon conversion process utilizing the invention.

Fig. 3 diagrammatically illustrates another procedure for practicing a hydrocarbon conversion process utilizing the present invention. In the process of Fig. 3 a reaction zone 50 and a regeneration zone 51 are included as in the previously described process, and the catalyst in each zone again may be maintained in the form of a moving bed. Intermediate the reactor and regenerator is a stripping zone 52 wherein residual hydrocarbons retained by the catalyst passing from reactor 50 through line 53 are stripped out by means of steam introduced through line 54. The stripped catalyst is transferred, as indicated by line 55, to the regenerator wherein it is blown countercurrently with air admitted through line 56 to burn the carbonaceous matter from the catalyst. As previously described, this tends to drive fluorine out of the catalyst largely in the form of HF which passes out with the regeneration gas through line 57.

To recover at least part of the fluorine from the regeneration gas, the gaseous effluent stream is introduced into a countercurrent contactor 58 near its base and the gas flows upwardly therein countercurrent to catalyst which has been transferred from the regenerator by means of line 59. Due to the fact that the gas phase in the lower part of contactor 58 is rich in fluorine as compared to the gas phase in the lower part of regenerator 51, the catalyst in contactor 58 will pick up or absorb fluorine from the regeneration gas. The effectiveness in transferring fluorine to the catalyst in the contactor can be improved by including cooling means (not shown) in either or both of the lines 57 and 59. Generally, it will be desirable to remove such amount of heat as would be in excess of the heat content required for the catalyst returned to reaction zone 50. This removal of heat conveniently may be done by flowing the flue gas from regenerator 51 through a heat exchanger (not shown) prior to introducing it into contactor 58.

The bulk of the catalyst from contactor 58 is transferred directly through lines 60, 61, 62 and 63 back to the reactor for re-use. HF, $SiF_4$ or other suitable fluorine-containing compound may be admitted through line 64 in amount as required to compensate for any losses of fluorine from the system. Generally it will be desirable to pass a minor portion or drag-stream of the catalyst from contactor 58 through line 65 to a suitable means, indicated at 66, for separating and removing deactivated particles of catalyst. This is customarily done in commercial practice by means of a shaking table adapted to sort the catalyst particles according to density. The more dense particles are the least active ones and are rejected through line 67, while the less dense material is catalytically active and hence is returned to the main catalyst stream through line 68.

With reference still to Fig. 3, the operations above-described result in three effluent materials which are to be discarded from the system but which have appreciable fluorine contents. One of these is the effluent steam which passes from stripper 52 through line 70, another is the effluent regeneration gas which passes from contactor 58 via line 71, and the third is the deactivated catalyst rejected by shaker 66 through line 67. In accordance with the invention, flourine may be recovered from each of these materials for re-use.

For effecting such fluorine recovery, there is provided an absorber 72 similar to the fluorine absorber described in connection with Fig. 1 and which may constitute a plurality of separate absorption zones. The contact agent employed in 72 may be an NaF-containing or KF-containing material as previously described. The effluent steam from stripper 52 passes through line 70 to one or more of the absorbers 72 and preferably is cooled before entering the absorber. Advantageously this stream may be cooled far below the temperature at which it leaves stripper 52, for example, to a temperature in the range of 250–500° F., but preferably is not cooled below its dewpoint. Likewise, the effluent flue gas in line 71 may be similarly cooled and then introduced into one or more absorbers 72 for recovery of the fluorine. Periodically each absorber may be subjected to a steaming operation by introducing high temperature steam through line 73 to displace the fluorine in the form of HF in steam. As indicated in Fig. 3, the fluorine-rich steam may be passed through line 74 to hopper 75 wherein it is utilized to treat fresh catalyst. Hence the fresh catalyst which is added to the cracking system whenever desired, as indicated by dashed line 76, will contain combined fluorine that will aid in maintaining the activity level desired for the circulating catalyst.

As an alternative procedure, the fluorine-rich steam from absorbers 72 may be passed by means of line 80 for use in treating used catalyst at any suitable point in the system or in another hydrocarbon conversion operation.

Fluorine can also be recovered from the deactivated catalyst rejected from shaker 66 by passing it to a stripper 77 to which high temperature steam is admitted via line 78. The steam from this operation may be passed through line 79 to absorber 72 or, if desired, it may be sent directly (by means not shown) to hopper 75 for contact with the fresh catalyst or to any suitable point in the system for treatment of the circulating catalyst.

The process of Fig. 3 is illustrated as involving steam stripping of the catalyst in a separate zone following its use in the reactor. Many commercial cracking plants include a stripping zone in the lower part of the reactor, so that the steam used for stripping will issue from the reactor in admixture with the hydrocarbon reaction products. In the event that it is desired to recover fluorine from such mixed effluent, this may be done by passing it through a fluorine absorber similar to absorber 72, the stream preferably being cooled prior to introduction to the absorber. In any event it is desirable not to cool the stream to such extent as to cause condensation of water prior to contacting it with the fluorine-absorbing material, as otherwise corrosion is apt to occur within the system.

The following specific example illustrates how fluorine present in one batch of catalyst can be displaced therefrom by means of steam and recovered in another batch of catalyst, thereby activating the second batch of catalyst:

A previously used commercial silica-alumina cracking catalyst was treated with gaseous HF until it had a combined fluorine content of 5.0% by weight. This treatment raised the activity index of the catalyst from 25.7 to 38.6. (Activity index is determined in the manner described in pages R–537 and R–538 of the National Petroleum News dated August 2, 1944.) The treated catalyst was used in a fixed bed operation for cracking gas oil through fifty cycles of operation. Each cycle involved an on-stream period at an average reaction temperature of about 860° F., a steam purging period, and a regeneration period during which the maximum catalyst temperature was in the range of 995–1040° F. After fifty cycles of such operation the fluorine content of the catalyst had dropped to 3.8% by weight and its activity index had decreased to 33.2.

The used catalyst was then subjected to a high temperature steaming operation to displace the fluorine. Steam in amount equivalent to 50 volumes of water was passed over 50 volumes of the used catalyst at a temperature of about 1100° F. during a time of about 4 hours. The effluent steam was passed directly from the used catalyst into 50 volumes of a second batch of the same silica-alumina catalyst which had not been treated with HF. The second batch of catalyst was maintained at a temperature of about 885° F. It was found that 90% of the fluorine remaining in the used catalyst after the fifty operating cycles was removed from it by such steaming and that the second batch of catalyst retained about 53% of the fluorine thus removed so that it had a fluorine content of 1.8% by weight. The amount of fluorine retained could have been increased by maintaining the second batch of catalyst at a lower temperature.

The treated second batch of catalyst was tested to determine its cracking activity. It was found that its activity index had increased from 25.7 to about 36.5. Also the yield of gas non-condensible at about −108° F. had decreased to 58% of the value obtained for the untreated catalyst.

It will be apparent that numerous modifications may be made in the above-described procedures for preventing loss of fluorine from catalytic conversion systems without departing from the scope of the invention. Principles of the invention are applicable not only to moving bed operations but also to fixed bed and fluid catalyst systems employing any of the silicon oxide or aluminum oxide types of catalysts. Selection of suitable conditions for recovering the fluorine from effluent streams by reacting the fluorine compounds with a contact material and of conditions for displacing it from contact material may readily be made, bearing in mind the following factors:

(1) Reduction in temperature promotes retention of the fluorine;
(2) Increase in pressure likewise promotes retention;
(3) The presence of moisture aids removal through hydrolysis of fluorine to HF; and
(4) Higher concentration of fluorine in the gas phase tends toward higher concentration in the solid material. By proper regulation of these factors, the fluorine can be made to tend toward either remaining predominantly in the contact material or mainly migrating out of it.

We claim:

1. In a hydrocarbon conversion process wherein a hydrocarbon charge stock is contacted under catalytic conversion conditions with a particle-form cracking catalyst containing fluorine in amount effective to promote the conversion reaction and the used catalyst is regenerated by contacting it with oxygen-containing gas to burn off carbonaceous deposits, the method of reducing loss of fluorine from the system which comprises gravitating the used catalyst as a bed downwardly through the regeneration zone, introducing the oxygen-containing gas into a lower part of said regeneration zone and flowing it upwardly countercurrent to the catalyst bed, withdrawing from an upper part of the regeneration zone combustion gas containing fluorine removed from the catalyst, passing the catalyst having reduced fluorine content directly into a third contact zone and gravitating it downwardly therein as a moving bed, introducing said combustion gas containing fluorine into a lower part of the third contact zone and flowing it upwardly countercurrent to the catalyst bed whereby the catalyst absorbs fluorine from the combustion gas, and separately withdrawing catalyst and combustion gas from the lower and upper parts of said third contact zone, respectively.

2. Method according to claim 1 wherein the combustion gas withdrawn from the upper part of said third contact zone is contacted in a fourth contact zone at a temperature below 600° F. but above its dewpoint with a solid absorbent material containing a compound selected from the group consisting of NaF and KF to remove residual fluorine.

3. Method according to claim 1 wherein the catalyst, after effecting said conversion reaction and prior to being introduced to the regeneration zone, is countercurrently stripped with steam to remove residual hydrocarbons therefrom whereby fluorine is also removed therefrom by the stripping steam, and the stripping steam is contacted at a temperature below 600° F. but above its dewpoint with a solid absorbent material containing a compound selected from the group consisting of NaF and KF to remove fluorine.

4. Method according to claim 3 wherein the combustion gas withdrawn from the upper part of said third contact zone is contacted in a fourth contact zone at a temperature below 600° F. but above its dewpoint with a solid absorbent material containing a compound selected from the group consisting of NaF and KF to remove fluorine.

References Cited in the file of this patent

UNITED STATES PATENTS

| | | |
|---|---|---|
| 2,459,775 | Passino | Jan. 18, 1949 |
| 2,481,207 | Eberle | Sept. 6, 1949 |
| 2,558,375 | Olson | June 26, 1951 |
| 2,643,971 | Lien et al. | June 30, 1953 |
| 2,686,151 | Feldbauer et al. | Aug. 10, 1954 |